United States Patent
Bollano et al.

(10) Patent No.: US 8,538,755 B2
(45) Date of Patent: Sep. 17, 2013

(54) CUSTOMIZABLE METHOD AND SYSTEM FOR EMOTIONAL RECOGNITION

(75) Inventors: Gianmario Bollano, Turin (IT); Donato Ettorre, Turin (IT); Antonio Esiliato, Campo Calabro (IT)

(73) Assignee: Telecom Italia S.p.A., Milan (IT)

( * ) Notice: Subject to any disclaimer, the term of this patent is extended or adjusted under 35 U.S.C. 154(b) by 945 days.

(21) Appl. No.: 12/449,259

(22) PCT Filed: Jan. 31, 2007

(86) PCT No.: PCT/EP2007/000815
§ 371 (c)(1),
(2), (4) Date: Dec. 4, 2009

(87) PCT Pub. No.: WO2008/092473
PCT Pub. Date: Aug. 7, 2008

(65) Prior Publication Data
US 2010/0088088 A1    Apr. 8, 2010

(51) Int. Cl.
*G10L 11/00*   (2006.01)
*G10L 11/04*   (2006.01)
*G06F 15/00*   (2006.01)

(52) U.S. Cl.
USPC ............ 704/236; 704/200; 704/206; 704/231

(58) Field of Classification Search
USPC .................................. 704/200, 206, 231, 236
See application file for complete search history.

(56) References Cited

U.S. PATENT DOCUMENTS 5,479,491 A * 12/1995 Herrero Garcia et al. . 379/88.15
5,724,449 A *  3/1998 Cornerford ................... 382/230
(Continued)

FOREIGN PATENT DOCUMENTS

EP    1 022 725  A1    7/2000
EP    1 282 113  A1    2/2003
(Continued)

OTHER PUBLICATIONS

Cowie, R. et al., Emotion Recognition in Human-Computer Interaction, IEEE Signal Processing Magazine, pp. 33-71, (Jan. 2001).
(Continued)

*Primary Examiner* — Eric Yen
(74) *Attorney, Agent, or Firm* — Finnegan, Henderson, Farabow, Garrett & Dunner, L.L.P.

(57) ABSTRACT

An automated emotional recognition system is adapted to determine emotional states of a speaker based on the analysis of a speech signal. The emotional recognition system includes at least one server function and at least one client function in communication with the at least one server function for receiving assistance in determining the emotional states of the speaker. The at least one client function includes an emotional features calculator adapted to receive the speech signal and to extract therefrom a set of speech features indicative of the emotional state of the speaker. The emotional state recognition system further includes at least one emotional state decider adapted to determine the emotional state of the speaker exploiting the set of speech features based on a decision model. The server function includes at least a decision model trainer adapted to update the selected decision model according to the speech signal. The decision model to be used by the emotional state decider for determining the emotional state of the speaker is selectable based on a context of use of the recognition system.

21 Claims, 10 Drawing Sheets

(56) References Cited

U.S. PATENT DOCUMENTS

| | | | |
|---|---|---|---|
| 5,806,027 A * | 9/1998 | George et al. | 704/230 |
| 5,893,059 A * | 4/1999 | Raman | 704/256.2 |
| 6,505,098 B1 * | 1/2003 | Sakamoto et al. | 700/245 |
| 6,510,411 B1 * | 1/2003 | Norton et al. | 704/254 |
| 6,513,010 B1 * | 1/2003 | Lewin et al. | 704/270.1 |
| 6,687,667 B1 * | 2/2004 | Gournay et al. | 704/222 |
| 6,789,061 B1 * | 9/2004 | Fischer et al. | 704/240 |
| 6,816,753 B2 * | 11/2004 | Sakamoto et al. | 700/245 |
| 7,167,544 B1 * | 1/2007 | Bauer | 379/88.01 |
| 7,194,069 B1 * | 3/2007 | Jones et al. | 379/88.02 |
| 7,373,300 B1 * | 5/2008 | Bangalore et al. | 704/270.1 |
| 7,392,185 B2 * | 6/2008 | Bennett | 704/243 |
| 7,457,752 B2 * | 11/2008 | Oudeyer | 704/258 |
| 7,584,104 B2 * | 9/2009 | Schroeter | 704/258 |
| 7,684,984 B2 * | 3/2010 | Kemp | 704/235 |
| 7,912,720 B1 * | 3/2011 | Hakkani-Tur et al. | 704/270 |
| 7,983,910 B2 * | 7/2011 | Subramanian et al. | 704/250 |
| 8,204,749 B2 * | 6/2012 | Hakkani-Tur et al. | 704/270 |
| 2002/0138274 A1 | 9/2002 | Sharma et al. | |
| 2002/0184023 A1 * | 12/2002 | Busayapongchai et al. | 704/251 |
| 2003/0028383 A1 | 2/2003 | Guerin et al. | |
| 2003/0028384 A1 * | 2/2003 | Kemp et al. | 704/275 |
| 2003/0050783 A1 | 3/2003 | Yoshizawa | |
| 2003/0069728 A1 | 4/2003 | Tato et al. | |
| 2006/0122834 A1 * | 6/2006 | Bennett | 704/256 |
| 2007/0219789 A1 * | 9/2007 | Capman | 704/219 |
| 2008/0058158 A1 * | 3/2008 | Kobayashi et al. | 477/134 |
| 2008/0082329 A1 * | 4/2008 | Watson | 704/235 |
| 2010/0180202 A1 * | 7/2010 | Del Valle Lopez | 715/728 |
| 2011/0207100 A1 * | 8/2011 | Brokken et al. | 434/236 |

FOREIGN PATENT DOCUMENTS

| | | |
|---|---|---|
| EP | 1 293 964 A2 | 3/2003 |
| EP | 1 300 831 A1 | 4/2003 |
| EP | 1 727 128 A2 | 11/2006 |
| WO | WO 2008/092474 A1 | 8/2008 |

OTHER PUBLICATIONS

Scherer, K. R., "What are Emotions? And How can They be Measured?", Social Science Information, SAGE Publications, vol. 44, No. 4, pp. 695-729, (2005).

Grimm, M. et al., "Combining Categorical and Primitives-Based Emotion Recognition," Proceedings of EUSIPCO 2006, 5 Sheets, XP002438047, (Sep. 2006).

Amir, N. et al., "Classifying Emotions in Speech: a Comparison of Methods," UROSPEECH 2001, vol. 1, 4 Sheets, XP007004575, (2001).

Noble, J., "Spoken Emotion Recognition with Support Vector Machines," Honour Thesis, Department of Computer Science The University of Melbourne, pp. 29-32, XP002438048, (Nov. 2003).

Santos, R., "Emotional Speech Recognition," Diploma Thesis. Technical University of Madrid, E.T,S.I.T., pp. xv-xix, xxi, xxiii, xv, xxix, 1-25, 27-269, 271-277, 291-299, XP002438049, (2002).

* cited by examiner

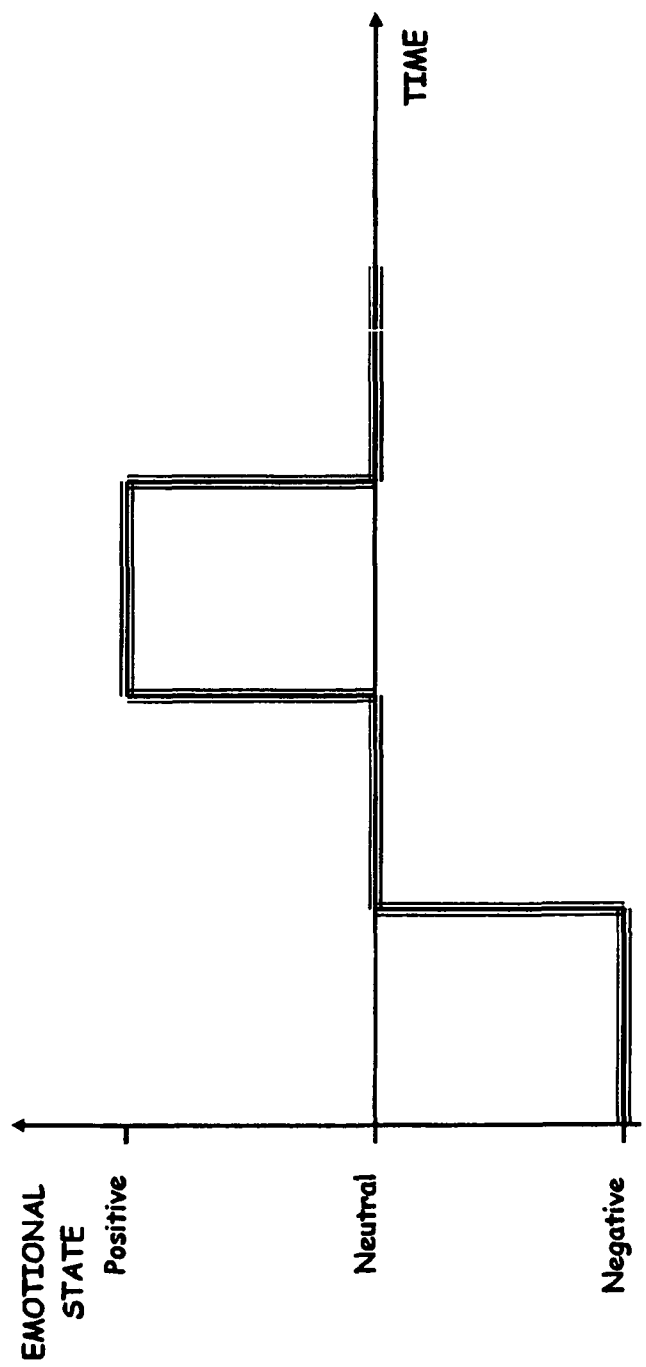

12  # CUSTOMIZABLE METHOD AND SYSTEM FOR EMOTIONAL RECOGNITION

CROSS REFERENCE TO RELATED APPLICATION

This application is a national phase application based on PCT/EP2007/000815, filed Jan. 31, 2007, the content of which is incorporated herein by reference.

BACKGROUND OF THE INVENTION

1. Field of the Invention

The present invention generally relates to the field of automated emotional recognition, and particularly to a distributed emotional recognition system for telecommunication networks, particularly adapted to being implemented on telecommunication terminals even of relatively low processing resources.

2. Description of the Related Art

The emotional recognition is a particular application in the artificial intelligence field. Purpose of emotional recognition is to improve the naturalness of the communication between man and machine and to enhance the efficiency of the communication means. Several researches have been developed on this theme, and the possible applications of emotional recognition are still being investigated in the present days.

An emotional recognition system is capable of identifying the emotional state of a user through the analysis of his/her speech. Normally, substantial data processing resources are needed to perform emotional recognition.

Emotional recognition systems for use in telecommunication networks are known in the art, having a distributed architecture based on the client-server paradigm, in which a user telecommunications terminal (e.g., a cellular phone, a smartphone or a Personal Digital Assistant) acts as a client, which, for the purpose of performing the emotional recognition, exploits the services provided by a server apparatus in communication therewith. The adoption of a distributed architecture allows the user telecommunication terminal, having limited data processing resources, exploiting the data processing resources of the server, the most onerous operations are performed by the server, and sophisticated services can be provided, at the same time permitting to locally manage the information at the client.

In particular, distributed architectures for the automated dialogue recognition are also known, including at least one device having a relatively low data processing capability (the client), which captures the dialogue, and, coupled thereto, a remote data processing device (the server). The adoption of such a client-server distributed architecture allows to exploit the hardware and software resources of the remote server, that are typically not available at the client, for analyzing the speech captured by the client. More particularly, the client captures the speech, generates a corresponding speech signal along with additional features extracted from the latter, and locally processes the speech, before applying coding according to the specific standard implemented by the transmission channel, in such a way to extract therefrom the best attributes that are to be used by the server for the automated dialogue recognition. The client can send the data to the server using a coding that differs from that used for coding the speech signal, so as to balance the automated recognition performances and the use of the transmission resources. If said local processing were not performed, and the analysis were instead performed by the server directly on the coded vocal signal, the automated dialogue recognition process would be negatively affected by the transmission channel coding, which is directed to the minimization of the transmission resources.

An emotion detection device and method for use in distributed systems is for example described in the published US patent application 2006/0122834. A prosody analyzer is distributed over a client/server architecture, so that the scope of emotion recognition processing tasks can be allocated on a dynamic basis based on processing resources, channel conditions, client loads etc. The partially processed prosodic data can be sent separately or combined with other speech data from the client device and streamed to a server for a real-time response. Training of the prosody analyzer with real world expected responses improves emotion modeling and the real-time identification of potential features such as emphasis, intent, attitude and semantic meaning in the speaker's utterances.

SUMMARY OF THE INVENTION

According to the Applicant, the known solutions are rather rigid, inflexible, and this makes them not particularly attractive in several possible applications.

The Applicant believes that it would be desirable to have emotional recognition systems and methods that can be personalized, for example to better conform the needs/desires of users of services that involve the emotional recognition.

The Applicant has tackled the problem of providing a system and method for automated emotional recognition that is more flexible, being susceptible of being personalized.

In particular, the Applicant has tackled the problem of providing an emotional recognition system and method particularly suitable for implementations involving the use of telecommunications terminals of scarce processing capability, like telephones, and possibly even scarce power supply resources, as it is in the case of battery-operated telecommunications terminals like, for example, mobile phones, PDAs, and similar devices.

According to an aspect of the present invention, an automated emotional recognition system is provided. The automated emotional recognition system is adapted to determine emotional states of a speaker based on the analysis of a speech signal. The emotional recognition system comprises at least one server function and at least one client function in communication with the at least one server function for receiving assistance in the determining the emotional states of the speaker. The at least one client function includes an emotional features calculator adapted to receive the speech signal and to extract therefrom a set of speech features indicative of the emotional state of the speaker. The emotional state recognition system further includes at least one emotional state decider adapted to determine the emotional state of the speaker exploiting the set of speech features based on a decision model. The decision model defines a set of rules, both statistical and not-statistical, among speech features, and is able to reproduce the relationships that have been established, during a training process of the model, between the elements of a training database and corresponding emotional states. The server function includes at least a decision model trainer adapted to update the selected decision model according to the speech features computed from the speech signal. The decision model to be used by the emotional state decider for determining the emotional state of the speaker is selectable based on a context of use of the recognition system.

According to another aspect of the invention, a corresponding method for the automatic emotional recognition of a speaker adapted to determine emotional states of the speaker based on the analysis of a speech signal is provided. The method for the automatic emotional recognition of a speaker adapted to determine emotional states of the speaker based on the analysis of a speech signal, comprises:

having a client function extract from the speech signal a set of speech features indicative of the emotional state;

using a decision model for performing emotional state decision operations on at least one emotional state decider, determining the emotional state from the set of speech features, having a server function, in communication relationship with the client function, at least updating the decision model according to the speech features, characterized in that:

the decision model to be used by the emotional state decider for determining the emotional state of the speaker is selectable based on a context of use of the recognition method.

BRIEF DESCRIPTION OF THE DRAWINGS

The features and advantages of the present invention will be best understood by reading the following detailed description of some embodiments thereof, given merely by way of non-limitative example, that will be conducted making reference to the accompanying drawings, wherein:

FIG. 8 illustrates a diagram showing how an exemplary succession of emotional states can be visually displayed by means of an emotional state display function, according to an embodiment of the present invention.

DETAILED DESCRIPTION OF THE PREFERRED EMBODIMENTS

Figure 1:
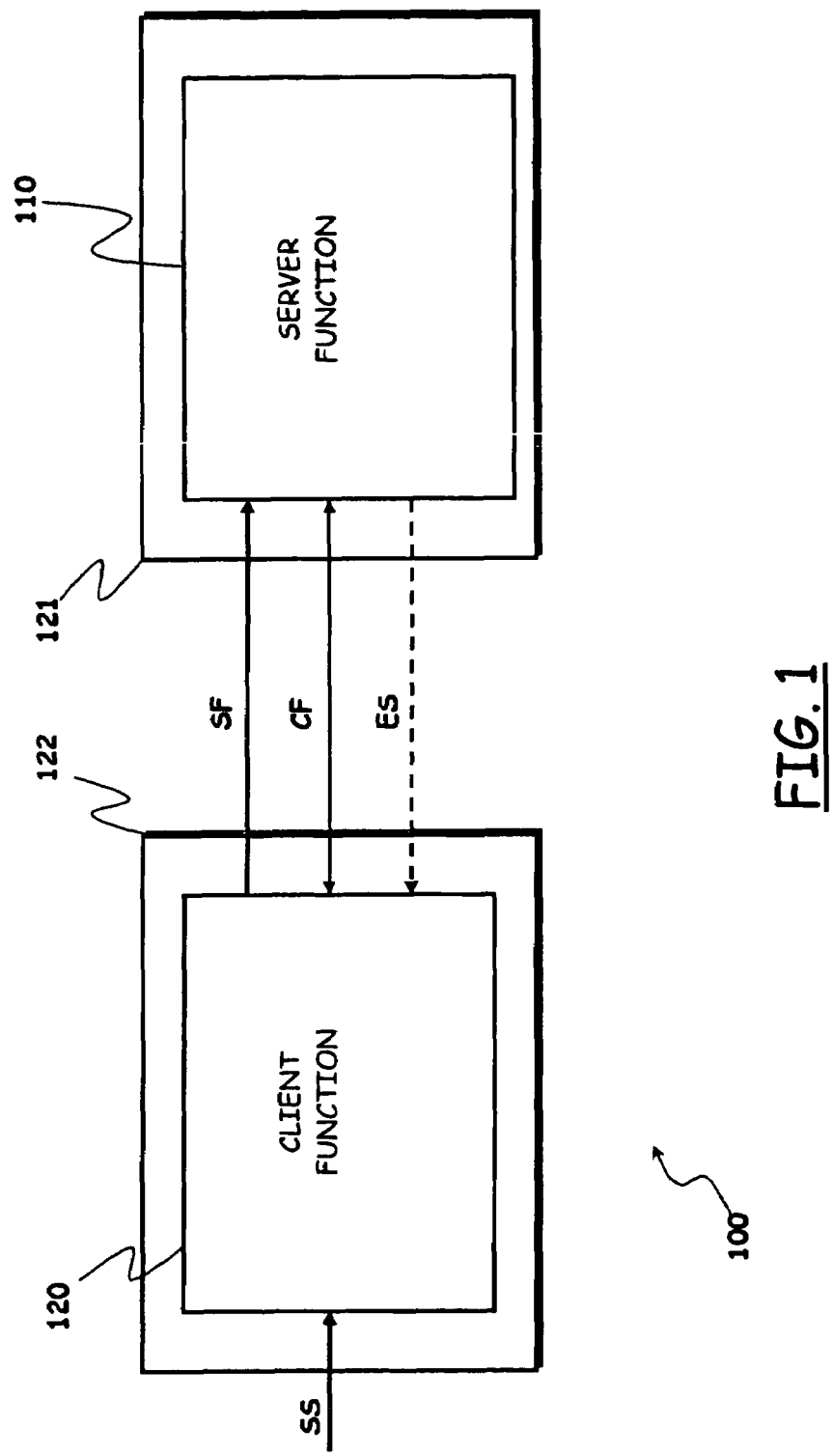
FIG. 1 schematically shows, in terms of functional blocks, an emotional recognition system according to an embodiment of the present invention.

With reference to the drawings, FIG. 1 schematically shows, in terms of functional blocks, the two main functional components of an emotional recognition system 100 according to an embodiment of the present invention, and, in terms of arrows from one block to the other, the data they exchange with one another. The emotional recognition system 100 includes a server function 110 that exchanges information with and provided services to a client function 120. The server function 110 resides for example in at least one server machine 121, for example a dedicated host computer, that is remotely connected (via a wired and/or wireless telecommunications network) to a user telecommunications terminal 122 implementing the client function 120; the user telecommunications terminal 122 may be a wireless or a wired telecommunications terminal, like for example a mobile phone, a PDA, or a cable telephone. For the sake of simplicity, only one server machine 121 and only one user telecommunications terminal 122 are shown in the drawing, however it is intended that the server machine 121 may provide services to several clients, and also that the server function may itself have a distributed architecture (the server function may be distributed across two or more host computers).

The emotional recognition system 100 is adapted to receive and analyze a speech signal SS—for example an audio signal received by the user telecommunications terminal 122, for example by another user telecommunications terminal, or locally generated by transducing a speech through a microphone (not shown) included in the telecommunications terminal 122 and, based on said analysis, to determine the emotional state of the speaker.

As will be explained in detail in the following of the present description, the client function 120 performs preliminary operations on the speech signal SS, and derives from the speech signal SS one or more speech features, the set of speech features being indicated as SF in the drawing; for example, the speech features SF include prosodic information useful for determining the emotional state of the speaker. The extracted speech features SF are then sent to the server function 110 on the server machine 121. The server function 110 processes the received set of speech features SF for determining the emotional state of the speaker. Once the emotional state has been determined, it may be used by the server machine 121 itself, for disparate purposes, or the information about the detected emotional state may be provided to a distinct application server (not shown in FIG. 1), which exploits it for providing services to the users of the telecommunication terminals, or the emotional state information may be sent back to the user telecommunications terminal 122, for local use. For example, in the latter case, the server machine 121 provides emotional state data ES identifying the determined emotional state to the user telecommunications terminal 122.

According to an embodiment of the present invention, the operation of the server function 110 implemented by the server machine 121 and of the client function 120 implemented by the user telecommunications terminal 122 can be configured, e.g. by the user of the telecommunications terminal, for personalizing the quality and the accuracy of the emotional recognition service provided by the server function 110 so as to conform to different possible contexts of use of the emotional recognition system 100.

As will be explained in the following of the description, according to an embodiment of the present invention, several of the operations performed by the server function 110 and by the client function 120 and of the parameters used for evaluating the emotional state can be configured. For this purpose, as schematically shown in FIG. 1, the server machine 121 and the user telecommunications terminal 122 additionally exchange configuration data CF providing information regarding how the operation to be performed by the emotional recognition system 100 have to be configured, depending for example on the preferences of the user of the telecommunications terminal.

Figure 2:
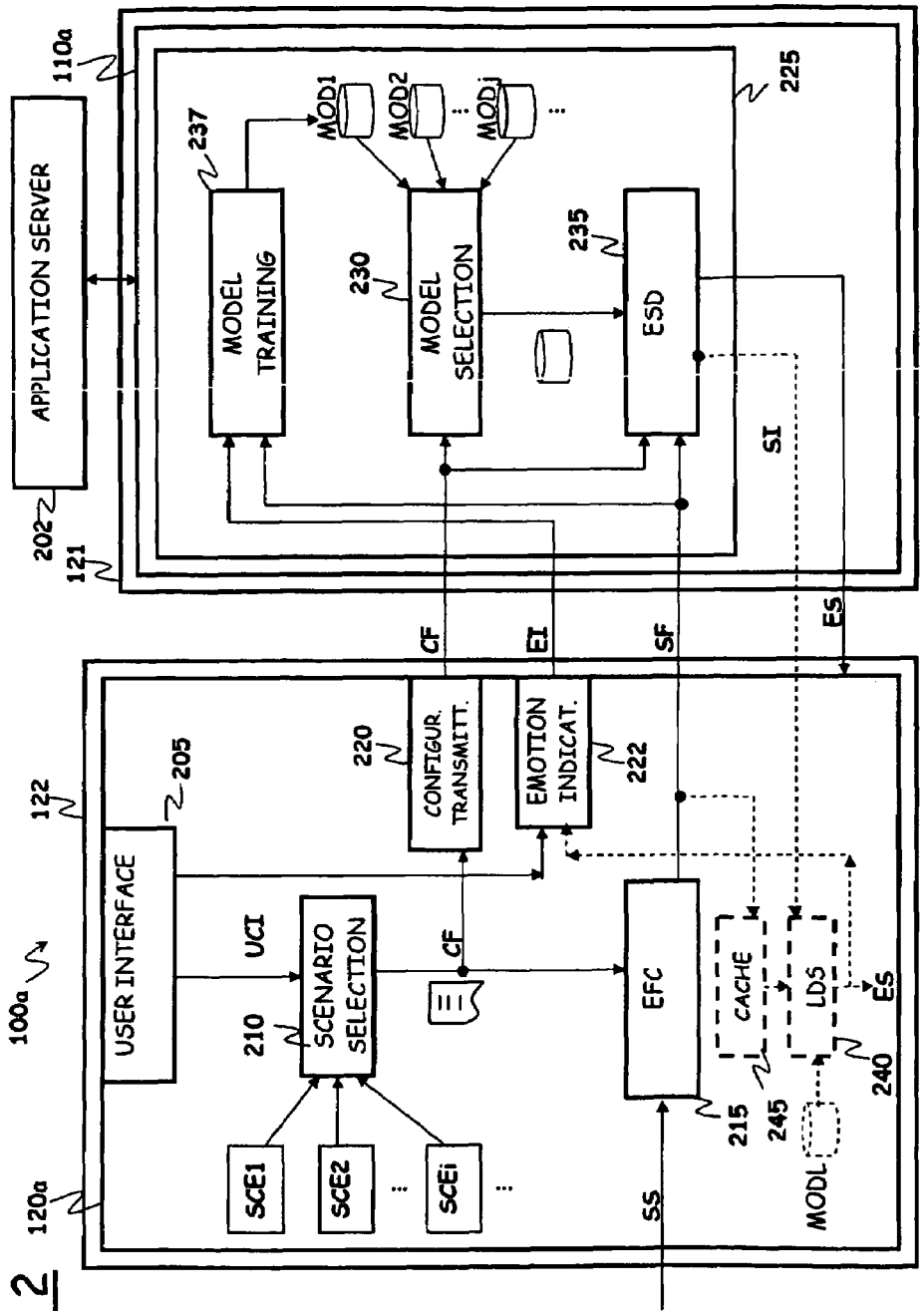
FIG. 2 schematically illustrates, in terms of functional blocks, an emotional recognition system according to a first practical embodiment of the present invention, having the general structure of the emotional recognition system of FIG. 1.

FIG. 2 schematically illustrates, in terms of functional blocks, an emotional recognition system 100a according to a first practical embodiment of the present invention, having the general structure of the emotional recognition system 100.

The emotional recognition system 100a includes a server function 110a residing on the server machine 121, and, residing on a user telecommunications terminal 122, a client function 120a. In the drawing, an application server 202 is also schematically shown, interacting with the server function 110a; the application server is for example a server intended to provide specific services to the users of the telecommunications terminals, which services involve the exploitation of the emotional recognition services provided by the server function 110a.

The client function 120a resident on the user telecommunications terminal 122 includes a user interface 205 adapted to allow the user of the telecommunications terminal to personalize the emotional recognition system 100a according to his/her preferences/needs. More particularly, through the user interface 205, the user may be able to select one desired "scenario" among a plurality of predetermined scenarios SCEi (i=1 to p). For the purpose of the present invention, by "scenario" there is meant a particular service that is offered to the user, through his/her telecommunications terminal, and which exploits the emotional recognition service provided by the emotional recognition system 100a; the generic scenario SCEi corresponds to a particular way of configuring the emotional recognition system 100a, in such a way to satisfy corresponding requirements, depending on the use that is made of the emotional recognition services. For example, the user may choose a scenario SCEi that corresponds to:

the emotional recognition of a speaker based on a speech spoken In a particular language;
different levels of accuracy (which correspond to different levels of complexity, in terms of data processing requirements) in the emotional recognition of a same speech, directed to distinguish a higher or lower number of different predetermined emotional states;
a noisy, unreliable communications channel between the user telecommunications terminal and the server machine, which may negatively affect or be of prejudice to the provision of the emotional recognition service by the server function;
the emotional recognition of a speaker having limited language capabilities, such as a children, a foreign person or an autistic person.

The client function 120a includes a scenario selection block 210, adapted to be driven by the user interface 205 in such a way as to select a scenario SCEi among the plurality of available scenarios SCEi, based on user configuration inputs UCI. The scenario selection block 210, depending on the selected scenario, generates corresponding configuration data CF for configuring an Emotional Features Calculation (EFC) block 215. The EFC block 215 receives the speech signal SS to be analyzed for determining the speaker's emotional state, and extracts therefrom corresponding speech features SF, the specific speech features that are extracted depending on the configuration data CF received. The extracted speech features SF are then transmitted to the server function 110a for being processed.

The client function 120a further includes a configuration data transmitter 220, that receives the configuration data CF from the scenario selection block 210 and sends them to the server function 110a. Furthermore, the client function 120a includes an emotion indicator block 222, adapted to be driven by the user (through the user interface 205) for sending emotional indications data EI, indicative of the user's emotional perception, to the server machine 110a, for the uses explained later.

The server function 110a includes a decision system block 225 responsible of processing the speech features SF received from the client function 120a, for determining the speaker's emotional state. More in particular, the decision system block 225 is capable of determining the speaker's emotional state based on the received speech features SF by performing operations that make use of a selected one among a plurality of predetermined decision models MODj (j=1 to p). Without entering into details not relevant to the scope of the present invention, and known to those skilled in the art, a generic decision model MOD) may be related to a particular grammar and/or to a particular spoken language. According to an embodiment of the present invention, the indication of which model MODj the server function has to use is included in the configuration data CF provided by the client function 120a. In other words, according to the embodiment of the invention herein considered, the model MOD) is (indirectly) set by the user of the user telecommunications terminal 122 by selecting one of the predefined scenarios.

The decision system block 225 includes a decision model selection block 230, that is adapted to receive the configuration data CF. Accordingly, the decision model selection block 230 selects a model MODj among the plurality of predetermined decision models MODj, and loads the selected model MODj into an Emotional State Decider (ESD) block 235. The ESD block 235 includes in particular a classifier adapted to classify the emotional state corresponding to a particular set of speech features SF. The ESD block 235 also receives the configuration data CF and the speech features SF from the client function 120a. Based on the selected decision model MODj and on the configuration data CF, the ESD block 235 processes the speech features SF and derives the speakers emotional state. Accordingly, the ESD block 235 generates the emotional state data ES, that, as already mentioned, are adapted to identify the determined speakers emotional state. For example, according to an embodiment of the present invention, the emotional state data ES are structured as a binary string, wherein each value that the binary digital string can take corresponds to a particular emotional state.

Depending on the function the emotional recognition system 100a is exploited for, the emotional state data ES may be directly employed by the server function 110a, or they may be sent back to the user telecommunications terminal 122. Also, the emotional state date ES may be sent to the application server 202, which may exploit them in the context of the service it is intended to provide to the user of the telecommunications terminal.

In order to improve the reliability of the emotional recognition process, during the operation of the emotional recognition system 100a the selected decision model MODj can be subjected to a training, directed to improve the emotional recognition performance, for example to adapt to a certain speaker. For this purpose, the decision system block 225 includes a decision model training block 237; the decision model training block 237 receives the emotional indications data EI from the emotion indicator block 222, and the speech features SF from the EFC block 215. The decision model training block 237 may use the speech features SF for training the selected decision model MODj according to the received emotional indications data EI, so that it becomes more precise in determining the emotional state of a certain speaker. In particular, based on the received speech features SF and on the emotional indications data EI, the decision model training block 237 updates and adjusts the selected decision model MODj. According to an embodiment of the present invention, the user is able to supervise the updating of the selected model MODj by indicating, through the emotional indications data EI, the emotional state that has to be recognized by the ESD block 235 depending on the received speech features SF.

According to an embodiment of the present invention, the emotional recognition can be also performed locally to the client function. For this purpose, the client function 120a resident on the user telecommunications terminal 122 may include a Local Decision System (LDS) block 240 that is adapted to derive the emotional state of a speaker from the speech features SF, according to a local decision model MODL available locally at the client function 120a. The specific local model MODL to be used by the LDS block 240 may be selectable based on the specific scenario selected by the user of the telecommunications terminal 122.

Preferably, In order to make the local emotional recognition more reliable, also the local decision model MODL is constantly kept updated by a local model training function internal to the LDS block 240; to this purpose, the LDS block 240 exploits score information SI received from the server function 110a, which indicates when a received speech features SF can be advantageously used for updating the selected decision model. In order to give time to the server function to process the speech features SF and produce the score information SI, the speech features SF are temporally stored into a memory, for example a cache memory 245, before being provided to the LDS block 240.

According to a further embodiment of the present invention, the emotion indicator block 222 can also be driven by the LSD block 240, for allowing a continuous training of the selected model MODj even in absence of any indication from the user.

Figure 3:
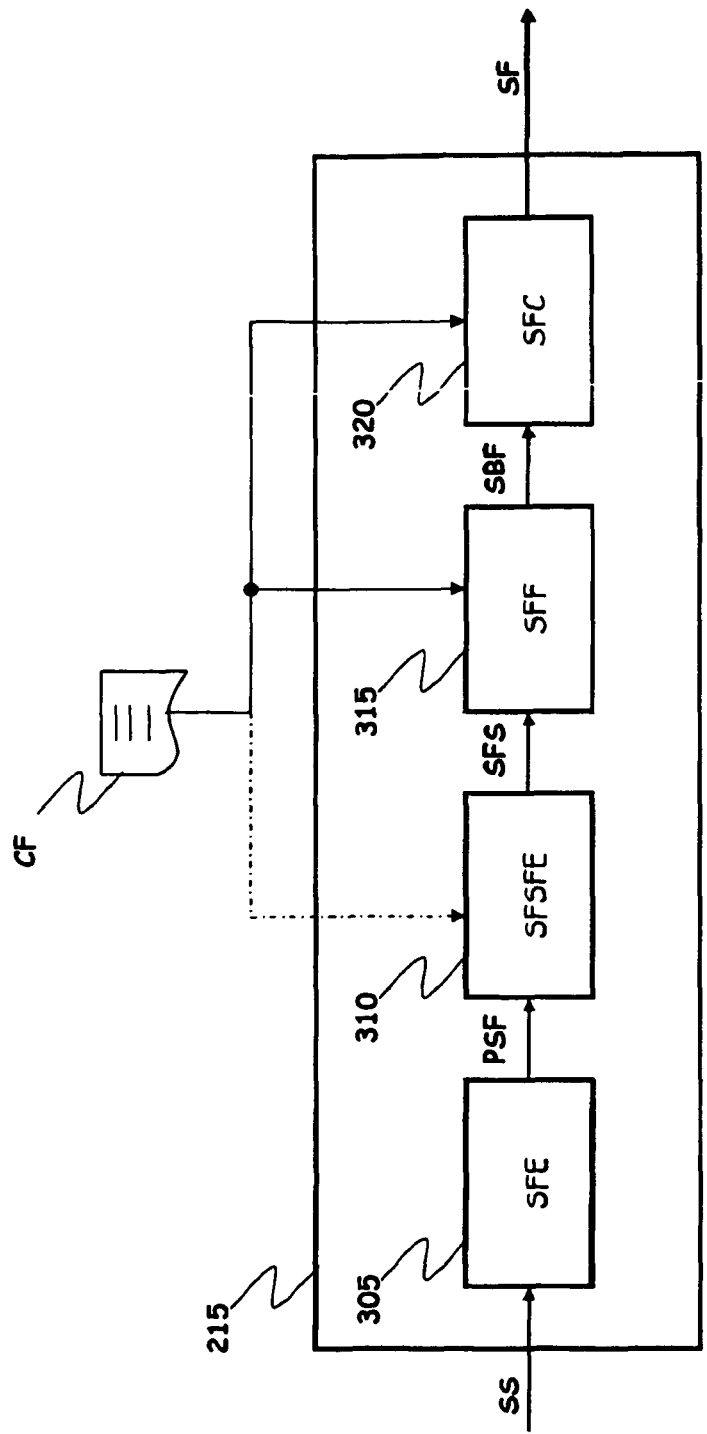
FIG. 3 is a more detailed view of an emotional features calculator block included in emotional recognition system of FIG. 1 according to an embodiment of the present invention.

FIG. 3 provides a more detailed view of the EFC block 215 of the client function 120a.

The EFC block 215 includes a Speech Feature Extraction (SFE) block 305, adapted to extract from the speech signal SS emotional features that are useful for the emotional recognition. The EFC block 215 further includes a Super-Frame Speech Feature Extraction (SFSFE) block 310, adapted to perform statistical and additional non-statistical operations on the emotional features extracted from the speech signal SS by the SFE block 305: A Speech Feature Filter (SFF) block 315 is also provided, adapted to select a particular set of emotional features from those that have been processed by the SFSFE block 310. The EFC block 215 further includes a Speech Feature Coding (SFC) block 320 for coding the set of emotional features in such a way to generate corresponding speech features SF, to be sent to the server function 110a.

More in particular, the SFE block 305 receives the speech signal SS. Then, the SFE block 305 performs a time division on the speech signal SS, in such a way as to divide the signal into frames; for example, the speech signal SS is divided into frames having each a time duration equal to a frame time t of the order of a few tens of ms. For each frame of the speech signal SS, a preliminary set PSF of emotional features are derived therefrom. Without entering into details known to the skilled technician, the preliminary set PSF of features may include the pitch, the first and the second formants (i.e., energy peaks) and the energy of the speech signal SS. Additionally, the preliminary set PSF include derived features, like for example the Linear Predictive Coding (LPC) coefficient and the Mel Frequency Cepstral Coefficient (MFCC).

Every frame time t, the preliminary set PSF of features is provided to the input of the SFSFE block 310. The SFSFE block 310 collects the preliminary sets PSF of features of a number h of consecutive frames (for example, h may be equal to tens or hundreds), for performing, on the collected preliminary sets of features, statistical operations like for example calculating the mean, the variance, the power density function, and non-statistical operations, like determining the maximum, the minimum and the first and second derivative. Then, after a time T equal to h frames of duration t, the SFSFE block 310 outputs to the SFF block 315 a Super Frame Set SFS of features formed by the results of the operations performed on said h frames. In this way, every h frames, i.e. with a time periodicity T=h*t, the SFF block 315 receives a new Super Frame Set SFS of features.

In order to keep low the data processing resources needed by the SFSFE block 310, the abovementioned operations are preferably performed step-by-step, at each frame time t. In this way, when the SFSFE block 310 has to process a Super Frame Set SFS of features, it does not store all the h corresponding preliminary set PSF of features; instead, it may save only partial values.

For example, the procedure for obtaining the mean value $<x_h>$ of a generic feature x over the values taken from h preliminary sets PSF is the following:

$$<x_h> = \frac{X_h}{h},$$

wherein:

$$X_h = \sum_{i=1}^{h} x[i]$$

and x[i] is the value of the feature x belonging to the i-th preliminary set PSF.

As another example, the variance value $Var(x)_h$ of a generic feature x over the values taken from h preliminary sets PSF can be obtained in the following way:

$$Var(x)_h = \frac{1}{h}\sum_{i=1}^{h} x^2[i] - <x_h>^2,$$

wherein x[i] is the value of the feature x belonging to the i-th preliminary set PSF and $<x_h>^2$ is the square of the mean values. Such a formulation allows to efficiently approximate the variance without the need of storing all the x[i] values of the feature, since the process is performed step-by-step.

Thanks to the presence of the SFSFE block 310, the throughput of the EFC block 215 is significantly reduced, since both the amount of data to be transferred to the SFF block 315 and the frequency with which they are sent are reduced.

According to an embodiment of the present invention, the SFF block 315 receives the configuration data CF, and it accordingly selects a filtered subset SBF of features from the features of the Super Frame Set SFS.

Figure 4:
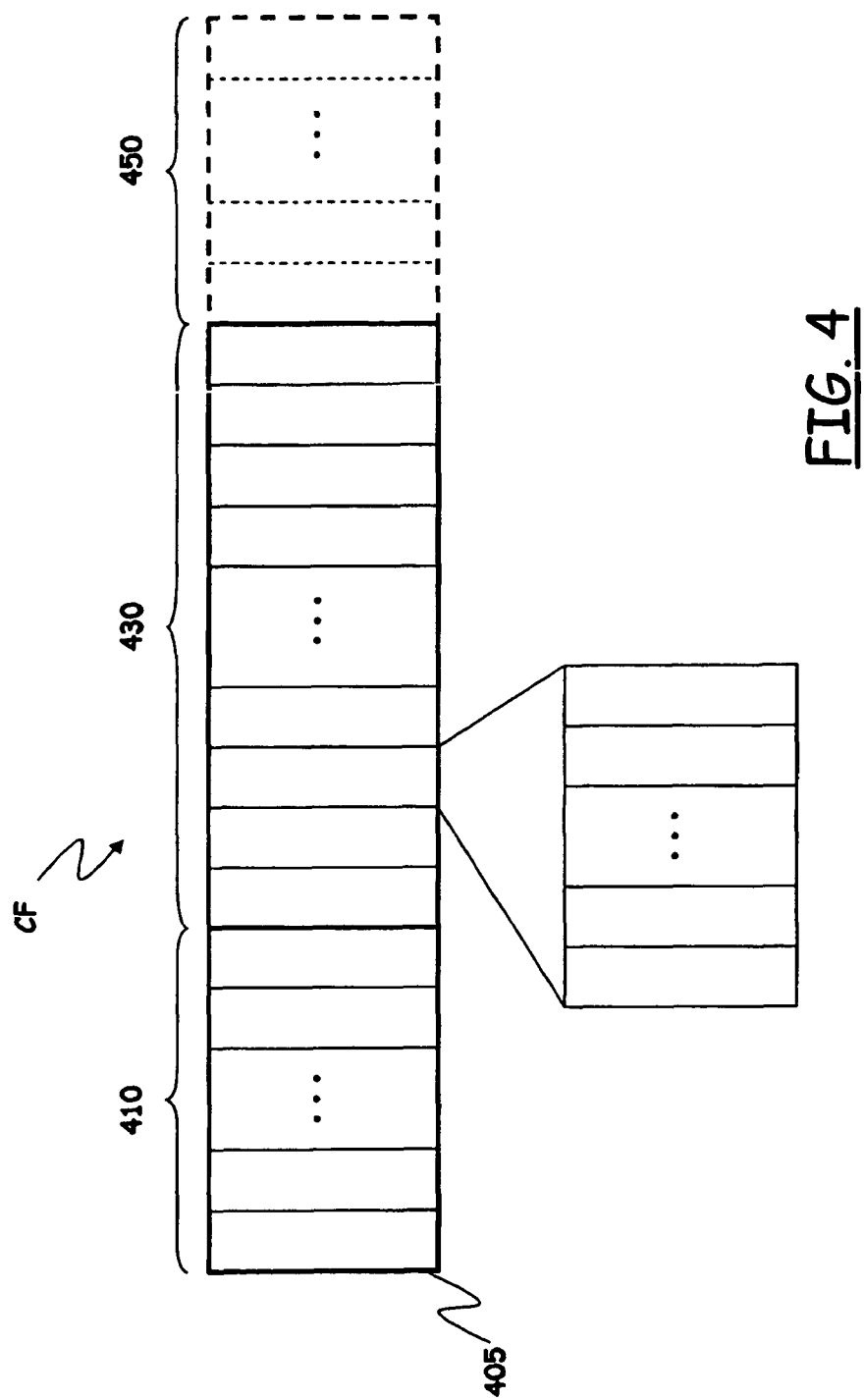
FIG. 4 shows the structure of an exemplary configuration data string that can be used by the emotional recognition system according to an embodiment of the present invention.

Merely by way of example, according to an embodiment of the present invention, the configuration data CF may be structured as a string of bits 405 (referred as "configuration string"), an example of which is schematized in FIG. 4.

The configuration data string 405 includes a configuration type field 410, formed for example of a number m of bits, and a feature mask field 430, formed of a number 0 of bits.

According to an embodiment of the present invention, the configuration type field 410 is intended to include information adapted to indicate the specific scenario SCEi that has been chosen by the user. For example, according to an embodiment of the present invention, each one of the $2^m$ possible different values that the configuration type field 410 can assume corresponds to a particular scenario of the plurality of possible scenarios SCEi. In case the user selects one of the predetermined possible scenarios SCEi, the values to be included in the feature mask field 430 are predetermined, and this field may be filled automatically, for example by the scenario selection block 210; the feature mask field may in this case even be left unused, provided that both the client function and the server function knows which features (and, possibly, with which degree of precision) are to be exploited for the emotional recognition process in each of the predetermined scenarios.

According to an embodiment of the present invention, in addition to the possibility of choosing one among several predetermined configurations (corresponding to the different possible scenarios), the user has also the possibility of configuring the emotional recognition system in a full-custom way. For example, one of the possible scenarios presented to the user, e.g. a scenario SCE0, may correspond to a peculiar value of the configuration type field 410 (for example, "000 . . . 0"). In this case, the feature mask field 430 may be filled with values inputted by the user, through the user interface 205.

The purpose of the feature mask field 430 is to carry information adapted to specify which speech features SF, among those extracted from the speech signal SS by the EFC block 215, have to be sent to the server function 110a for being analyzed and processed by the decision system 225, and which of the extracted features are instead not used. The number 0 of bits of the feature mask field 430 depends on the total number of speech features SF that can be extracted from the speech signal SS by the SFSFE block 310, i.e., on the number of features included in the Super Frame Set SFS. For example, every bit in the feature mask field 430 may correspond to a different speech feature SF, and its value may indicate whether said specific speech feature SF has to be sent to the server function 110a and used by the decision system 225 for performing the emotional recognition process, or not used. The higher the number of speech feature SF that are sent to the decision system 225, the more accurate the emotional recognition and the higher the data to be sent to the server function 110a and to be processed. For example, the features corresponding to values "1" in the feature mask field 430 are selected by the SFF block 315 and they are included into the filtered subset SBF, while those corresponding to the "0" values are "filtered out" and they are not selected.

Additionally, more than one bit may be associated to each speech feature SF in the feature mask field, in such a way to provide to the server function 110a additional information, like for example the precision degree, e.g. the resolution level (i.e., the number of bits) used for representing the values assumed by the speech feature SF. In this way, it is possible to individually specify the resolution level used for coding each speech feature SF retrieved by the EFC block 215 that has to be sent to the server machine 110a.

The configuration data string 405 may include an additional information field 450, for specifying additional information directed to better characterize the operations that both the EFC block 215 and the decision block 225 have to perform for the emotional recognition process. For example, according to a further embodiment of the present invention, the additional field 450 may contain information adapted to specify a decision model MODj that has to be loaded and used by the decision system 225 of the server function 110a for performing the emotional recognition operations. Alternatively, according to another embodiment of the present invention, for each scenario SCEi it may be associated a corresponding predetermined MODj. Moreover, according to a further embodiment of the present invention, the additional information field 450 may also include indications regarding the duration of the time periodicity T with which the SFSFE block 310 outputs to the SFF block 315 the Super Frame Sets SFS of features. In this latter case, the configuration data string 405 needs to be provided also to the SFSFE block 310.

Even if in the exemplary embodiment herein considered the SFF block 315 is included in the EFC block 215 of the client function 120a, similar considerations can be applied in case the SFF block 315 is included in the server function 110a. In this case, however, all the features of the Super Frame Set SFS should be sent to the server function 110a.

Referring back to FIG. 3, the filtered subset of features SBF, filtered according to the configuration data CF, is then provided to the SFC block 320, which, according to an embodiment of the present invention, also receives the configuration data CF. The SFC block 320 processes the features of the filtered subset SBF, and accordingly outputs the speech features SF to be sent to the server function 110a. Said speech features SF are derived from the filtered subset SBF through coding operations performed by the SFC block 320. More in particular, each speech feature SF may be coded by the SFC block 320 with the resolution level specified in the feature mask field 430 of the configuration data string 405.

Thus, according to the embodiments of the present invention herein considered, the user may set the configuration data CF for controlling the operation of the SFF block 315, the SFC block 320 and the SFSFE block 310. For example, the SFF block 515 may be instructed to operate in such a way as to select those features that, given a predetermined set of emotional states, allow a more accurate recognition; moreover, by providing the SFC block 320 with proper configuration data CF, it is possible to extensively vary the Quality of Service (QoS) provided by the emotional recognition system 100a.

The operation of the emotional recognition system 100a will be now described.

Figure 5:
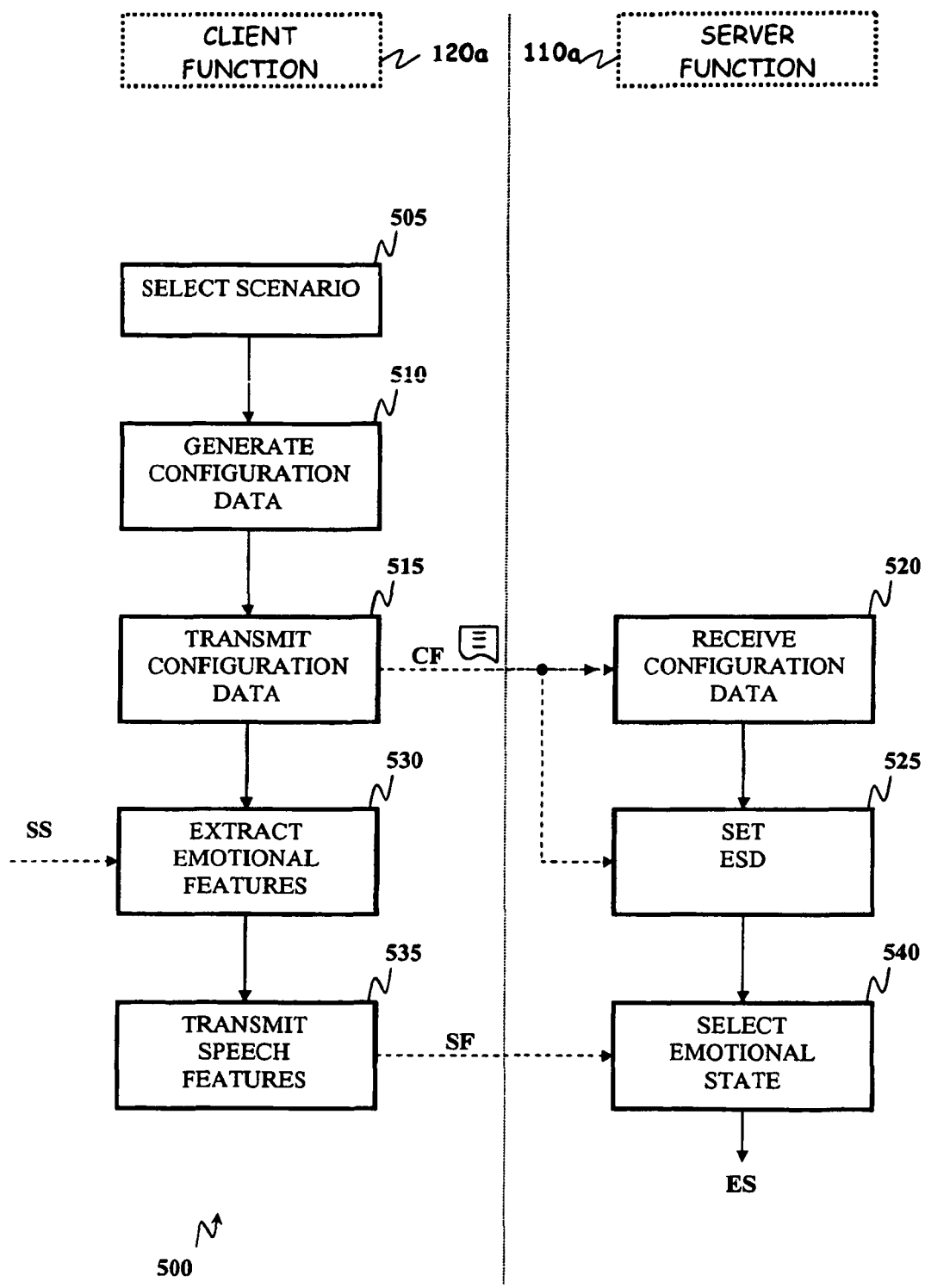
FIG. 5 illustrates a flow chart schematically showing the interactions of a server function with client function of the emotional recognition system of FIG. 1 when operating, according to an embodiment of the present invention.

FIG. 5 illustrates a flow chart 500 schematically showing the interactions of the server function 110a with the client function 120a when operating, according to an embodiment of the present invention.

Firstly, referring to FIG. 2, the user configures the client function 120a through the user interface 205, in such a way to select a particular scenario SCEi from the plurality of predetermined possible scenarios, or to define a full-custom scenario, not belonging to the predetermined ones. Accordingly, the scenario selection block 210 selects the desired scenario SCEi (block 505 of FIG. 5) and generates the corresponding configuration data CF (block 510 of FIG. 5), automatically (in case the user chooses one of the predetermined scenarios) or under instructions of the user. At the same time, in case the selected decision model MODj is subjected to a training, the emotion indicator block 222 is driven, for example by the user, in such a way to generate corresponding emotional indications data EI.

Then, the configuration data CF (and, in case, the emotional indications data EI) are provided to the EFC block 215. The configuration data CF are also sent to the decision system block 225 of the server function 110a (block 515 of FIG. 5) through the configuration transmitter 220.

The configuration data CF are thus received by the decision system 225, and in particular by the decision model selection block 230. According to an embodiment of the present invention, the decision model selection block 230 selects the decision model MODj specified in the additional field 450 of the configuration data string 405 (block 520 of FIG. 5), and then loads the selected model into the ESD block 235. The configuration data CF are also provided directly to the ESD block 235. In this way, the ESD block 235 is configured according to the received configuration data CF (block 525 in FIG. 5). More particularly, the ESD block 235 is configured in such a way to perform emotional recognition operations on a specified, particular set of speech features SF, with a particular resolution.

At the client side, the EFC block 215 receives the speech signal SS to be processed. Then, the EFC block 215 starts performing on the speech signal SS the operations previously described in connection with the FIG. 3, in such a way to extract therefrom corresponding speech features SF (block 530 in FIG. 5).

The speech features SF extracted by the SFC block 320 are then sent to the server function 110*a* (block 535 of FIG. 5), and they are received by the ESD selection block 235.

Based on the selected decision model MODj and on the configuration data CF, the ESD block 235 processes the received speech features SF and (the classifier included therein) determines, in a per-se know way, the emotional state associated thereto (block 540 of FIG. 5).

Depending on the case, the indication about the detected emotional state may be directly used by the server function 110*a* itself, or they may be provided to the application server 202 which provides a service to the user of the telecommunications terminal 120, or it may be sent back to the user telecommunications terminal 120, for local use.

In the latter two cases, as previously mentioned, the ESD block 235 generates the emotional state data ES—that are indicative of the emotional state detected by the system—and sends them to the application server 202 or to the user telecommunications terminal 120.

Figure 6:
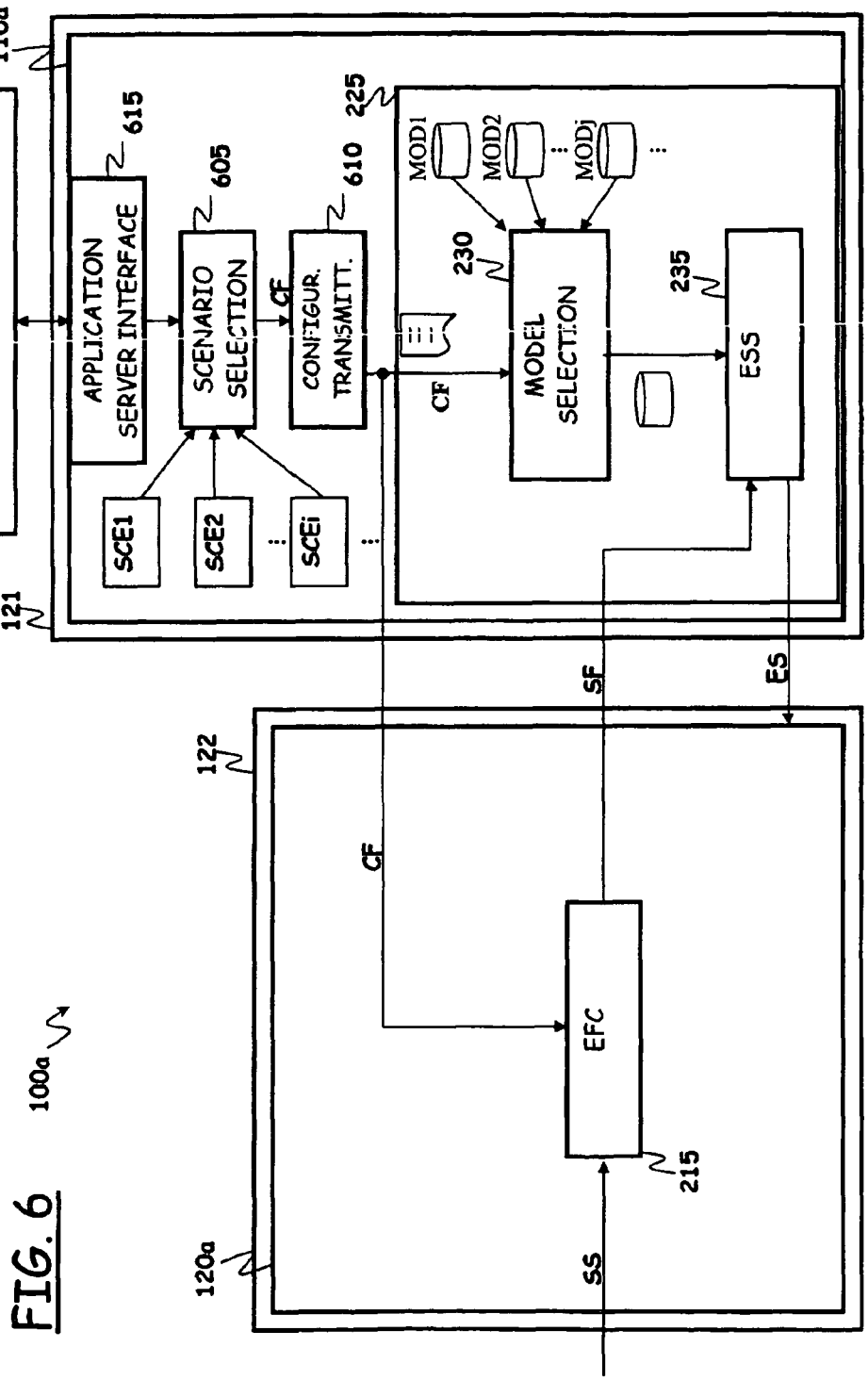
FIG. 6 schematically illustrates, in terms of functional blocks, an emotional recognition system having the general structure of the emotional recognition system of FIG. 1, according to an alternative embodiment of the present invention FIG. 7 schematically illustrates, in terms of functional blocks, an emotional recognition system according to a second practical embodiment of the present invention.

Although in the emotional recognition system 100*a* illustrated in FIG. 2 the selection of which scenario SCEi among the plurality of available scenarios SCEi is performed by the user through the user interface 205 on the user telecommunications terminal 122, similar considerations apply in case the scenario SCEi is not selected by the user, for example in case the choice of the scenario SCEi is done by the application server 202, as illustrated in FIG. 6. In these cases, the configuration data CF are generated by a scenario selection block 605 which is included in the server function 110*a*. The configuration data CF are then sent to the user telecommunications terminal 122, through a configuration data transmitter function 610 included in the server function 110*a*. In order to allow the application server 202 to interact with the scenario selection block 605, the server function 110*a* may include an interface 615 similar to the abovementioned user interface 205 on the user telecommunications terminal 120.

Figure 7:
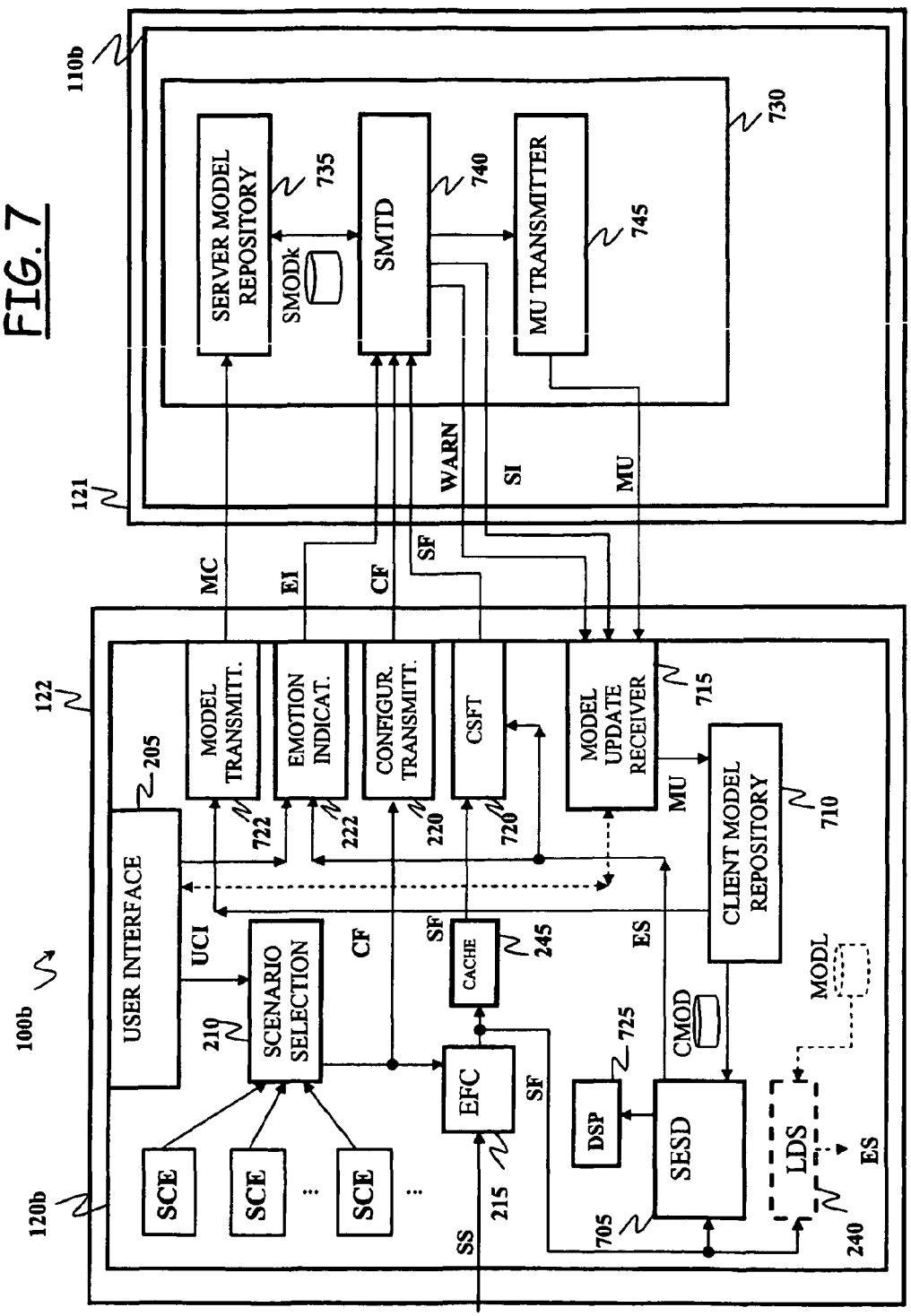

FIG. 7 schematically illustrates, in terms of functional blocks, an emotional recognition system 100*b* according to a second practical embodiment of the present invention. In this embodiment, the emotional recognition is mainly performed on the user telecommunications terminal 122, and the server machine 121 is mainly exploited to perform training operations on the decision models used by the user telecommunications terminals for performing the emotional recognition process. As will be more clear in the following of the description, the emotional recognition system 100*b* is more suitable to offer a speaker-dependent emotional recognition service, allowing to improve the accuracy of the emotional state recognition in respect of the different users.

The emotional recognition system 100*b* includes a server function 110*b*, residing on the server machine 121, and a client function 120*b* residing on the user telecommunications terminal 122. The elements corresponding to those shown in the FIG. 2 are denoted with the same references, and their explanation is omitted for the sake of brevity.

While in the emotional recognition system 100*a* of the previously described embodiment the emotional state recognition process is entirely performed by the server function (the ESD block 235 is included in the server function 110*a*), in the emotional recognition system 100*b* the emotional state recognition process is performed by the client function 120*b*. For this purpose, the to client function 120*b* includes, in addition to the components already described in connection with FIG. 2, a Shared Emotional State Decider (SESD) block 705, adapted to receive the speech features SF extracted from the speech signal SS by the EFC block 215, for determining the speaker's emotional state and providing the emotional state data ES.

The client function 120*b* further includes a client-side decision model repository 710 adapted to store a client decision model CMOD to be used by the SESD block 705 for performing the emotional recognition operations. The client decision model repository 710 is adapted to receive model update data MU from the server function 110*b*, trough a model update receiver 715 part of the client function 120*b*.

The client function 120*b* further includes a Conditioned Speech Features Transmission (CSFT) block 720 adapted to transmit the speech features SF extracted by the EFC block 215 to the server function 110*b*, conditioned to the outcome of the emotional recognition performed by the SESD block 705, represented by the emotional state data ES from the SESD block 705.

According to an embodiment of the present invention, the client function 120*b* further includes a client model transmission block 722, adapted to transmit model construction data MC related to the client decision model CMOD stored in the client-side decision model repository 710, to the server function 110*b*. As will be made apparent in the following of the description, the server function 110*b* is capable of exploiting the decision model construction data MC for generating a copy of the client decision model C MOD.

Additionally, the client function 120*b* may include an emotional state display function 725, operatively coupled to the SESD block 705, and adapted to present to the user, e.g. on a display device of the user telecommunications terminal 122, a succession of detected emotional states ("emotional course") detected from the speech signal SS. For example, according to an embodiment of the present invention, the emotional state display function 725 is capable of processing the emotional state data ES derived through the emotional analysis of the speech signal SS, and causing the displaying of a corresponding diagram showing, in respect of different periods of time, the determined emotional state; in particular, in an embodiment of the present invention, three different emotional states may be defined: a "positive" emotional state (for example, happy), a "neutral" emotional state (for example, relaxed) and a "negative" emotional state (for example, sad), as is schematically shown in FIG. 8.

According to an embodiment of the present invention, the server function 110*b* includes a training block 730, responsible of performing the training of the client decision model CMOD.

More particularly, the training block 730 includes a server-side decision model repository 735, adapted to store a plurality of server decision models SMODk; the server decision model repository 735 is further adapted to receive the decision model construction data MC from the client function 120b. The server decision model repository 735 is coupled to a Server Model Training and Decider (SMTD) block 740, which can select the decision model to be updated from the server decision model repository 735.

According to an embodiment of the present invention, the server decision model repository 735 includes at least one server decision model SMODk in respect of each client function 120b that is in communication therewith.

Alternatively, as will be more clear in the following of the description, instead of storing the server decision models SMODk of all the client functions 120b in the server decision model repository 735, it is possible to save memory resources by reconstructing each server decision model SMODk using the construction data MC provided by each corresponding client function 120b.

The SMTD block 740 is adapted to receive, from the generic client function 120b (particularly, from the CSFT block 720), the speech features SF and (from the configuration data transmitter 220) the configuration data CF; the SMTD block 740 is further adapted to receive, from the server decision model repository 735, a selected server decision model SMODk, corresponding to the specific client function 120b. Based on the speech features SF and the configuration data CF received from the client function 120b, the SMTD block 740 is adapted to evaluate the reliability of the selected server decision model SMODk, as well as to determine whether the model needs to be updated or not. In the affirmative case, the SMTD block 740 is adapted to perform a training process to update the selected server decision model SMODk stored in the server decision model repository 735, and to generate corresponding model update data MU. The training block 730 further includes a model update transmission block 745, which is adapted to receive from the SMTD block 740 the model update data MU, and to transmit the model update data MU to the client side 120b (in particular, to the model update receiver 715).

The operation of the emotional recognition system 100b will be now described according to an embodiment of the present invention.

Figure 9A:
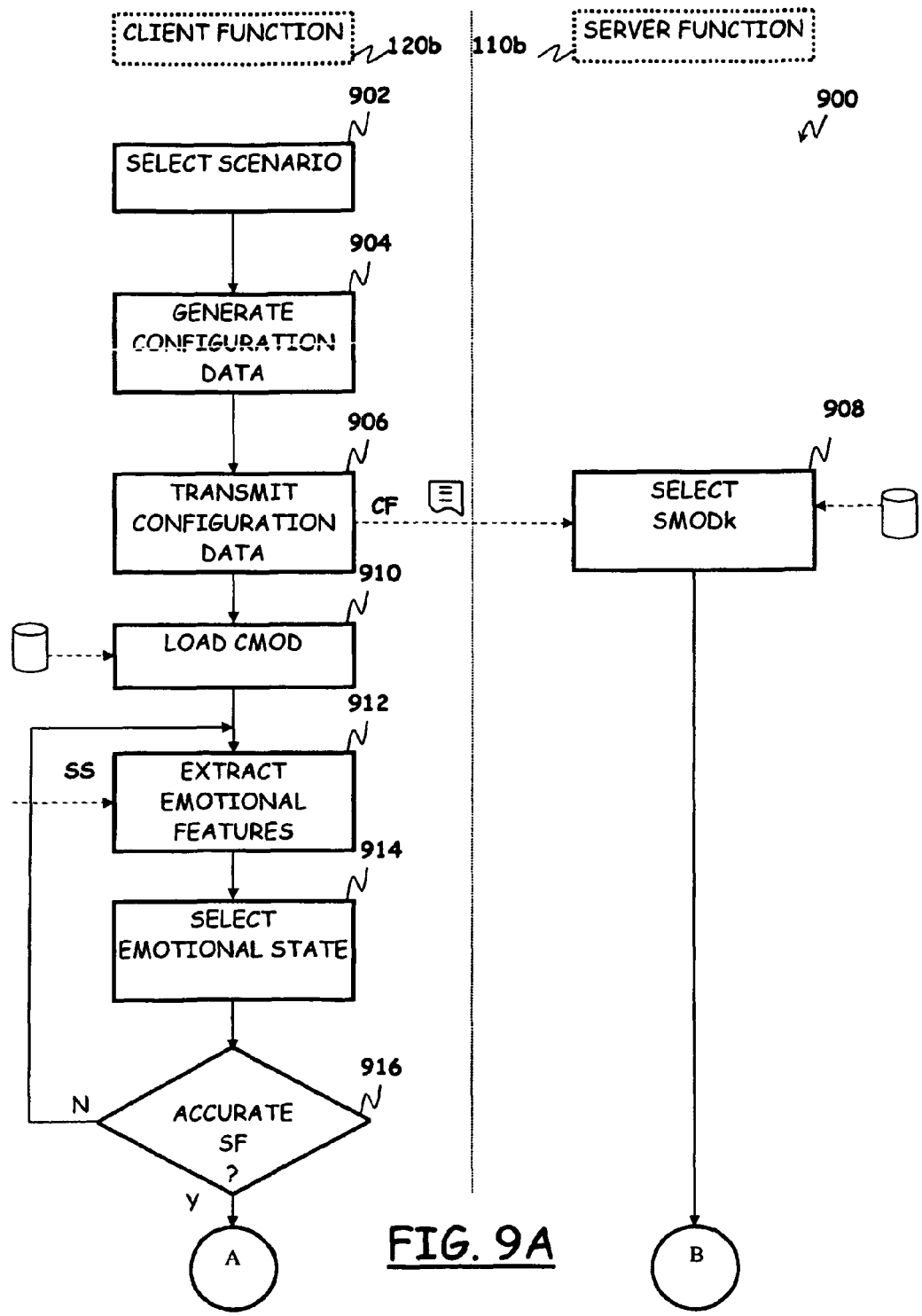
FIGS. 9A and 9B illustrates a flow chart schematically showing the interactions of a server function with client function of the emotional recognition system of FIG. 7 when operating, according to an embodiment of the present invention.
Figure 9B:
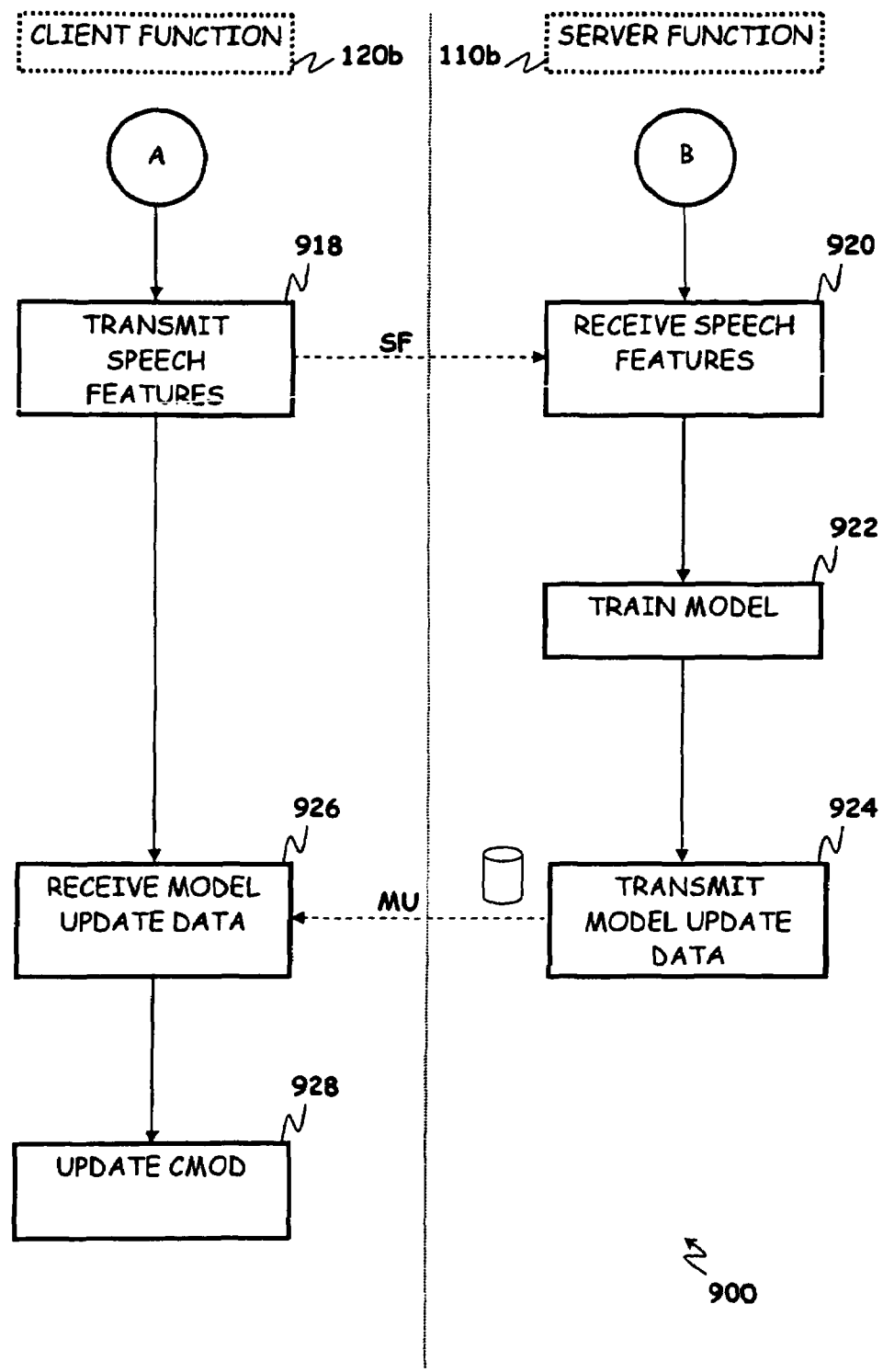

FIGS. 9A and 9B illustrates a flow chart 900 schematically showing the interactions of the server function 110b with the client function 120b when operating, according to an embodiment of the present invention.

Firstly, similarly to the first embodiment described in the foregoing, the user configures the client function 120b through the user interface 205, in such a way to select a particular scenario SCEi from the plurality of predetermined possible scenarios, or to define a full-custom scenario, not belonging to the predetermined ones. Accordingly, the scenario selection block 210 selects the desired scenario SCEP (block 902) and generates the corresponding configuration data CF (block 904), automatically (in case the user chooses one of the predetermined scenarios) or under instructions of the user.

Then, the configuration data CF is provided to the EFC block 215. The configuration data CF are also sent to the training block 730 of the server function 110b (block 906) by the configuration transmitter 220. At the same time, in case client decision model CMOD is subjected to a training, the emotion indicator block 222 is driven, e.g., by the user or by the SESD block 705, in such a way to generate corresponding emotional indications data EI.

The configuration data CF are thus received by the training block 730, and in particular by the SMTD block 740. According to an embodiment of the present invention, the SMTD block 740 selects from the server decision model repository 735 the server decision model SMODk specified in the configuration data CF (block 908). Then, the selected server decision model SMODk is loaded into the SMTD block 740. In this way, the SMTD block 740 is configured in such a way to perform training operations on the selected server decision model SMODk, that corresponds to the specific user of the telecommunications terminal 122.

At the client side, the client decision model CMOD stored in the client decision model repository 710 is loaded into the SESD block 705 (block 910). In this way, the SESD block 705 is configured to perform emotional recognition operations based on the client decision model CMOD. According to an alternative embodiment of the present invention, the client decision model CMOD may be provided by the server function 110b; for example, the server function 110b may send to the client function 120b a selected one of the decision model SMODk available in the server decision model repository 735, selected on the basis of the indications included in the configuration data CF received from the client function 120b.

It has to be underlined that, at the time the client decision model CMOD is loaded into the SESD block 705, such a model is a "speaker-independent" model, which has not yet be personalized in respect of the user's speech peculiarities.

The EFC block 215 receives the speech signal SS to be processed. Then, the EFC block 215 starts performing on the speech signal SS the operations previously described in connection with the FIG. 3, in such a way to extract therefrom corresponding speech features SF (block 912).

The speech features SF extracted from the speech signal SS are then provided to the SESD block 705; the speech features SF are also temporarily stored into a memory, for example the cache memory 245, waiting for being provided to the CSFT block 720.

Based on the client decision model, the SESD block 705 processes the received speech features SF and (the classifier included therein) determines the emotional state associated thereto (block 914). Accordingly, the SESD block 705 generates the emotional state data ES—that are indicative of the emotional state detected by the system—and sends them to the CSFT block 720.

Depending on the outcome of the emotional recognition performed by the SESD block 705, i.e., depending on the emotional state data ES, and depending on the selected scenario SCEi, the CSFT block 720 may send to the server function 110b the speech features SF that have been exploited by the SESD block 705 and that have been previously stored in the cache memory 245.

More particularly, in case the outcome of the emotional recognition performed by the SESD block 705 is not sufficiently accurate (i.e., in case the SESD has not been capable of correctly recognizing and classifying the received speech features SF into a corresponding emotional state), the speech features SF may be not considered useful for the purpose of training the client decision model CMOD, and they may be consequently not sent to the server function 110b (decision block 916, exit branch N). In this way, the next time a new speech signal SS is provided to the EFC block 215 to be processed (return back to block 912), the extracted speech features SF will be processed by the SESD block 705 using the same client decision model CMOD that has been previously employed.

In case the SESD block 705 has recognized and classified the received speech features SF with a sufficient degree of accuracy—e.g., set by the user through the selection of the scenario SCEi, or automatically established by the emotional recognition system 100b—(decision block 916, exit branch Y), the speech features SF are considered useful for the purpose of training the client decision model CMOD, and the CSFT block 720 sends the extracted speech features SF to the training block 730 in the server function 110b (block 918).

The speech features SF are then received by the SMTD block 740 (block 920). The speech features SF provide to the SMTD block 740 information data that are "speaker-dependent", since they strictly depend on the peculiarities of the speech of the particular user which exploits the telecommunication terminal 122.

The SMTD block 740 preliminary processes the speech features SF in order to establish whether the selected server decision model SMODk needs to be updated or not. In the affirmative case, the SMTD block 740 performs a training process to update the selected server decision model SMODk stored in the server decision model repository 735 according to the information data provided by the received speech features SF (block 922). Moreover, in case the server function 110b is shared among more than one client function 120b, and the server decision model repository 735 does not store the copies of all the corresponding client decision models CMOD, according to an embodiment of the present invention the server decision model SMODk may be also modified according to the model construction data MC received from a further client function 120b, whose corresponding client decision model CMOD needs to be trained. In this way, the server decision model SMODk is modified in such a way to match with the client decision model CMOD stored in said further client function 120b.

Then, in response to the training process, the SMTD block 740 generates corresponding model update data MU to be sent to the client function 120b. More particularly, the model update data MU are provided to the model update transmission block 745, and then they are transmitted to the model update receiver 715 in the client function 120b (block 924). Being derived by "speaker-dependent" speech features SF, the model update data MU are directed to adjust the client decision model CMOD in such a way as to improve the accuracy of the emotional state recognition operations performed by the client function 120b in respect of the distinctiveness of the user itself.

Then, the model update data MU are received by the model update receiver 715 (block 926), and are provided to the client decision model repository 710, in order to update the client decision model C MOD stored therein (block 928).

In this way, the next times the same user of the telecommunication terminal 122 will exploit the emotional state recognition service provided by the client function 120b, he/she will experience an improved and more accurate emotional recognition service, since the decision model CMOD used for performing the emotional recognition operations has been trained following the peculiarities of the user's speech itself.

According to an embodiment of the present invention, when the model update data MU are provided to the client function 120b, they entirely replace the client decision model CMOD stored in the client decision model repository 710. In other words, the server function, after having updated the model in respect of that user, transmits to the client function the whole updated decision model.

According to an alternative embodiment of the present invention, the model update data MU transmitted by the server function 110b to the client function 120b comprises instead only the data representing the differences, changes between the server decision model SMODk that has been subjected to the training by the SMTD block 740 and the client decision model CMOD. This allows reducing the amount of data to be exchanged between the server function and the client function. Similar considerations can be also applied for the decision model construction data MC.

Additionally, according to a further embodiment of the present invention, the SMTD block 740 is capable of evaluating the reliability of the speech features SF. In case the speech features SF received from the client function 120b are reputed to be not particularly useful or even detrimental to the training of the model, the SMTD block 740 alerts the client function 120b, by sending a warning WARN thereto (e.g. to the model update receiver 715). In this case, the model update receiver 715 of the client function 120b may be informed to reject the model update data MU transmitted by the server function 110b in response to the analysis of said speech features SF.

According to an alternative embodiment of the present invention, in case the speech features SF received from the client function 120b are reputed to be not particularly useful or even detrimental to the training of the model, the SMTD block 740 does not transmit any model update data MU to the client function 120b. Even in this case, the client function 120b may be alerted with the warning WARN.

According to an embodiment of the present invention, the user may request at any time to "reset" the client decision model CMOD, in order to replace it with a default "speaker-independent" decision model, for example stored in the server decision model repository 735 of the server function 110b.

Although in the operations previously described in connection with FIGS. 9A and 9B the transmission of the speech features SF from the client side 120b to the server side 110b is managed in an automated way, according to an embodiment of the present invention the user of the telecommunication terminal 120 has the possibility of personally supervising the decision of whether to send the speech features SF or not. In order to make said decision, the user may be helped by the observation of the emotional course provided by the emotional state display function 725.

In order to improve the possibility of personalizing the quality and the accuracy of the emotional recognition service provided by the emotional recognition system 100b, the client decision model repository 710 may be implemented in a portable storage device, like a smart card or a SIM (Subscriber Identity Module) card, removably coupled to the user telecommunications terminal 122. In case the user telecommunication terminal 122 is a mobile phone, said possibility allows the user to obtain the same quality and accuracy also using different telecommunication terminals 122. In fact, it is possible to exploit the client decision model CMOD that has been previously trained using another telecommunication terminal 122 provided that the client decision model repository 710 is the same (e.g., this can be achieved by using the same SIM card with different telecommunication terminals).

It has to be underlined that, according to the embodiment of the invention illustrated in the FIG. 7, the client decision model CMOD used by the SESD block 705 is independent of the local decision model MODL used by the LDS block 240. As in the case of the emotional recognition system 100a illustrated in FIG. 2, the LDS block 240 is optional.

Additionally, according to an embodiment of the present invention, the SMDT block 740 and the SESD block 705 can interact with each other during the training process to update the selected server decision model. More particularly, on the client side, the client decision model CMOD stored in the client decision model repository may be updated by exploiting the warning WARN and the score information SI; on the server side, the server decision model SMODk can be trained by exploiting emotional indications data EI provided by the emotion indicator block 222 when the latter is driven by the SESD block 705.

Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

The invention claimed is:

1. An automated emotional recognition system for determining emotional states of a speaker based on analysis of a speech signal, comprising:
at least one server function;
at least one client function in communication with and receiving assistance in determining the emotional states of the speaker from the at least one server function, wherein the at least one client function comprises an emotional features calculator adapted to receive the speech signal and to extract therefrom a set of speech features indicative of an emotional state of the speaker; and
at least one of either the client function or server function comprising at least one emotional state decider adapted to determine the emotional state of the speaker exploiting the set of speech features based on a decision model, the server function comprising at least a decision model trainer adapted to update the decision model according to the speech features, and
one of a plurality of decision models to be used by the emotional state decider being selected based on a user selecting a predefined scenario from a user telecommunications terminal,
wherein the extracted set of speech features, extracted from the speech signal by the emotional features calculator, to be used by the emotional state decider for determining the emotional state are configurable based on user-generated configuration data related to context of use and adapted to define at least one among:
type of features to be extracted; and
precision of the extracted features,
wherein the emotional features calculator comprises at least one of:
a speech features extractor adapted to extract from the speech signal a plurality of preliminary sets of emotional features;
a super-frame speech features extractor adapted to process the plurality of preliminary sets of emotional features and obtain a super-frame set of emotional features based on the processing of the plurality of preliminary sets of emotional features; and
a speech feature filter adapted to select, by filtering from the super-frame set of emotional features, a subset of emotional features.

2. The emotional recognition system of claim 1, wherein the emotional features calculator further comprises a speech feature coder adapted to code the subset of emotional features, obtain the set of speech features based on the coding of the subset of emotional features, and provide the set of speech features to the at least one emotional state decider.

3. The emotional recognition system of claim 1, wherein said configuration data are provided by a scenario selector.

4. The emotional recognition system of claim 3, wherein the scenario selector is in the client function and wherein said configuration data are provided by a user of the client function through the scenario selector, and the client function comprises a configuration transmitter adapted to transmit the configuration data to the server function.

5. The emotional recognition system of claim 1, wherein the server function comprises a decision model selector adapted to select a decision model among a plurality of decision models, stored in a server model repository, according to the configuration data.

6. The emotional recognition system of claim 1, wherein the client function comprises a decision model selector adapted to select a decision model among a plurality of decision models stored in a client model repository.

7. The emotional recognition system of claim 6, wherein:
the client function comprises a speech features transmitter adapted to transmit the speech features to the decision model trainer;
the decision model trainer is adapted to update a selected decision model according to the speech features and to generate corresponding model update data; and
the server function comprises a model update transmitter adapted to transmit the model update data to the client function to update the client decision model.

8. The emotional recognition system of claim 7, wherein the client function comprises a client model transmission block adapted to transmit the model update data to the server function to update the server decision model.

9. A method for the automatic emotional recognition of a speaker adapted to determine emotional states of the speaker based on analysis of a speech signal, comprising:
having a client function extract from the speech signal a set of speech features indicative of an emotional state;
using a decision model for performing emotional state decision operations on at least one emotional state decider, thereby determining the emotional state from the set of speech features; and
having a server function, in communication relationship with the client function, at least updating the decision model according to the speech features,
one of a plurality of decision models to be used by the emotional state decider being selected based on a user selecting a predefined scenario from a user telecommunications terminal,
wherein an extracted set of speech features extracted from the speech signal by an emotional features calculator to be used by the emotional state decider for determining the emotional state are configurable based on configuration data related to context of use and adapted to define at least one among:
type of features to be extracted; and
precision of the extracted features,
wherein extracting from the speech signal the set of speech features indicative of the emotional state, comprises the steps of:
extracting from the speech signal a plurality of preliminary sets of emotional features;
processing the plurality of preliminary sets of emotional features and obtaining a super frame set of emotional features based on the processing of the preliminary sets of emotional features;
selecting from the super frame set of emotional features a subset of emotional features;

coding the subset of emotional features and obtaining a set of speech features based on the coding of the subset of emotional features; and sending the set of speech features to the at least one emotional state decider.

10. The method of claim 9, further comprising the step of transmitting the configuration data to the server function.

11. The method of claim 10, wherein a number of emotional features selected from the super frame set is determined by the configuration data.

12. The method of claim 11, wherein the filtered subset set of emotional features is coded with a precision defined by the configuration data.

13. The method of claim 9, further comprising the step of providing the configuration data at the client function.

14. The method of claim 13, further comprising the step of transmitting the configuration data to the server function.

15. The method of claim 9, wherein the decision model is selected from a plurality of decision models according to the configuration data.

16. The method of claim 9, wherein determining the emotional state from the set of speech features is performed at the server function.

17. The method of claim 9, wherein determining the emotional state from the set of speech features is performed at the client function.

18. The method of claim 17, wherein the decision model is selected from a plurality of decision models according to the configuration data,
further comprising the steps of:
storing the selected decision model at the client function; and
storing at least one server decision model at the server function.

19. The method of claim 18, further comprising the steps of:
transmitting the speech features from the client function to the server function; and
updating the server decision model according to the speech features for generating corresponding model update data.

20. The method of claim 19, further comprising the step of transmitting the model update data to the client function.

21. The method of claim 20, further comprising the step of updating the selected decision model according to the model update data.

* * * * *